US012735908B2

(12) United States Patent
Mitchell

(10) Patent No.: US 12,735,908 B2
(45) Date of Patent: Sep. 15, 2026

(54) ENCLOSURE SYSTEM FOR BUILDING ENTRYWAY

(71) Applicant: Arconic Technologies LLC, Pittsburgh, PA (US)

(72) Inventor: Michael David Mitchell, Woodstock, GA (US)

(73) Assignee: Arconic Technologies LLC, Pittsburgh, PA (US)

( * ) Notice: Subject to any disclaimer, the term of this patent is extended or adjusted under 35 U.S.C. 154(b) by 443 days.

(21) Appl. No.: 18/483,139

(22) Filed: Oct. 9, 2023

(65) Prior Publication Data

US 2024/0133194 A1 Apr. 25, 2024
US 2024/0229483 A9 Jul. 11, 2024

Related U.S. Application Data

(60) Provisional application No. 63/380,138, filed on Oct. 19, 2022.

(51) Int. Cl.

| | |
|---|---|
| ***E04G 21/24*** | (2006.01) |
| ***E06B 1/02*** | (2006.01) |
| ***E06B 1/52*** | (2006.01) |
| *E06B 1/18* | (2006.01) |
| *E06B 1/30* | (2006.01) |

(52) U.S. Cl.
CPC .............. *E04G 21/241* (2013.01); *E06B 1/02* (2013.01); *E06B 1/52* (2013.01); *E06B 1/18* (2013.01); *E06B 1/30* (2013.01); *E06B 1/524* (2013.01)

(58) Field of Classification Search
CPC ... E06B 1/52; E06B 1/524; E06B 1/28; E06B 1/02; E06B 1/30; E06B 1/18
See application file for complete search history.

(56) References Cited

U.S. PATENT DOCUMENTS 7,340,866 B1 * 3/2008 Smith ........................ E06B 1/30 52/745.15
10,760,329 B1 * 9/2020 Maas ..................... E06B 3/9642
2017/0328117 A1 * 11/2017 Wang ....................... E06B 3/223
(Continued)

FOREIGN PATENT DOCUMENTS

DE 3036791 A1 * 5/1981
DE 10062298 A1 * 7/2002 ............... E06B 3/92
(Continued)

*Primary Examiner* — Brian E Glessner
(74) *Attorney, Agent, or Firm* — Vorys, Sater, Seymour and Pease LLP

(57) ABSTRACT

An enclosure system for a building includes an entryway for the building defined by opposing left and right frame-side jambs and a frame-side transom extending between the left and right frame-side jambs, and a temporary enclosure system removably installable within the entryway. After removing the temporary enclosure system from the entryway, the enclosure system further includes a left door-side jamb attachable to the left frame-side jamb to form an assembled left jamb, a right door-side jamb attachable to the right frame-side jamb to form an assembled right jamb, and a door-side transom attachable to the frame-side transom to form an assembled transom. One or more doors are hung within the entryway and extend laterally between the assembled left and right jambs and vertically to the assembled transom.

20 Claims, 8 Drawing Sheets

(56) References Cited

U.S. PATENT DOCUMENTS

| | | | | |
|---|---|---|---|---|
| 2018/0135346 A1* | 5/2018 | Warren | ..................... | E06B 1/38 |
| 2019/0063142 A1* | 2/2019 | Clarke, Jr. | ................ | E06B 1/18 |
| 2019/0169919 A1* | 6/2019 | Carleton | ................. | E06B 1/524 |
| 2019/0376282 A1* | 12/2019 | Michel | ................... | H01R 13/73 |
| 2023/0007876 A1* | 1/2023 | Agrawal | ............... | E06B 3/6722 |

FOREIGN PATENT DOCUMENTS

| | | | | |
|---|---|---|---|---|
| DE | 102007031839 A1 * | 1/2008 | ............... | E06B 9/04 |
| DE | 202013100184 U1 * | 4/2014 | ............. | E06B 5/168 |
| DE | 202016101911 U1 * | 5/2017 | ............. | E04G 21/30 |
| EP | 0278364 A2 * | 8/1988 | ........... | E04G 21/241 |
| FR | 2924149 A1 * | 5/2009 | ............. | E06B 1/528 |
| JP | 2654492 B2 * | 9/1997 | | |
| JP | 2754428 B2 * | 5/1998 | | |
| WO | WO-2017188241 A1 * | 11/2017 | ............... | E06B 1/52 |

* cited by examiner

ENCLOSURE SYSTEM FOR BUILDING ENTRYWAY

FIELD OF THE DISCLOSURE

The present disclosure relates generally to the construction and installation of door frames and, more particularly, to an enclosure system for a building that includes a temporary enclosure system used to temporarily secure the building until doors can be hung.

BACKGROUND OF THE DISCLOSURE

When constructing portions of a building with a large entryway, such as a storefront door entry, the timely installation of a door and the corresponding frame assembly may be required to properly enclose ("dry-in") the building. Without proper building enclosure, the interior of the building is exposed to the elements, which may affect the condition of interior building materials and structures. Moreover, proper building enclosure helps prevent possible theft and vandalism within the interior of the building.

However, when supply-chain or labor issues prevent the timely production of doors and/or frames, the entryway opening for the door may be left exposed for the duration of the lead time required to manufacture and deliver the door and associated framework. While the framing process for the storefront may be performed prior to the delivery of the door and frame, the assembly, installation, and possible glazing of the storefront may not be possible until the frame and the door are fully assembled.

These delays in both the delivery of the door/frame and the construction of the storefront may hinder the timely construction of the project. Further, for door/frame manufacturing companies, it may become difficult to obtain jobs with long lead times, such that customers will choose the shortest lead time to provide the quickest building enclosure.

SUMMARY OF THE DISCLOSURE

Embodiments disclosed herein include an enclosure system for a building that includes an entryway for the building defined by opposing left and right frame-side jambs and a frame-side transom extending between the left and right frame-side jambs, a temporary enclosure system removably installable within the entryway, after removing the temporary enclosure system from the entryway, a left door-side jamb attachable to the left frame-side jamb to form an assembled left jamb, a right door-side jamb attachable to the right frame-side jamb to form an assembled right jamb, and a door-side transom attachable to the frame-side transom to form an assembled transom, and one or more doors hung within the entryway and extending laterally between the assembled left and right jambs and vertically to the assembled transom. In a further embodiment, the window system further includes a left sidelight section, the left frame-side jamb forming part of the left sidelight section, a right sidelight section, the right frame-side jamb forming part of the right sidelight section, and a header section extending between the left and right sidelight sections, the frame-side transom forming part of the header section. In another further embodiment, the temporary enclosure system includes a left temporary jamb piece removably coupled to the left frame-side jamb and adapted to receive and secure a first lateral side of one or more temporary panels, a right temporary jamb piece removably coupled to the right frame-side jamb and adapted to receive and secure a second lateral side of the one or more temporary panels, and a temporary header piece removably coupled to the frame-side transom and adapted to receive and secure an upper end of the one or more temporary panels. In another further embodiment, the temporary enclosure system includes the one or more temporary panels secured within the entryway and including the first lateral side received within a first longitudinal slot defined by the left frame-side jamb, the second lateral side received within a second longitudinal slot defined by the right frame-side jamb, and the upper end received within a third longitudinal slot defined in the frame-side transom. In another further embodiment, the temporary enclosure system further includes a threshold installed at a bottom of the entryway and extending between the left and right temporary jamb pieces, and a central support extending vertically between the threshold and the temporary header piece. In another further embodiment, the temporary enclosure system further includes a threshold protective cover that interposes the threshold and a bottom of the central support, and wherein a bottom of the one or more temporary panels rests on the threshold protective cover. In another further embodiment, the one or more temporary panels comprises a first temporary panel providing the first lateral side and extending between the central support and the left frame-side jamb, and a second temporary panel providing the second lateral side and extending between the central support and the right frame-side jamb. In another further embodiment, the first and second temporary panels are removably fastened to the central support. In another further embodiment, the one or more temporary panels are notched to accommodate a shape of the left and right temporary jamb pieces and the temporary header piece. In another further embodiment, a) the left temporary jamb piece and the left frame-side jamb, b) the right temporary jamb piece and the right frame-side jamb, and c) the temporary header piece and the frame-side transom each provide complementary first and second mating features that facilitate removable attachment. In another further embodiment, the complementary first and second mating features each include a notch defined on the first mating feature, and a corresponding protrusion defined on the second mating feature and configured to locate and be received within the notch to help enhance the removable attachment. In another further embodiment, the first and second longitudinal slots each include a retaining feature that grips and helps retain the one or more temporary panels within the first and second longitudinal slots once received therein. In another further embodiment, the one or more doors comprise a left door rotatably mounted to the assembled left jamb, and a right door rotatably mounted to the assembled right jamb.

Embodiments disclosed herein may further include a method of constructing an enclosure system for a building, the method including constructing an entryway for the building, the entryway being defined by opposing left and right frame-side jambs and a frame-side transom extending between the left and right frame-side jambs, installing a temporary enclosure system within the entryway and thereby securing the building, removing the temporary enclosure system from the entryway, attaching a left door-side jamb to the left frame-side jamb to form an assembled left jamb, attaching a right door-side jamb to the right frame-side jamb to form an assembled right jamb, attaching a door-side transom to the frame-side transom to form an assembled transom, and hanging one or more doors within the entryway, the one or more doors extending laterally between the assembled left and right jambs and vertically to the assembled transom. In a further embodiment, constructing the entryway for the building comprises assembling a left sidelight section, the left frame-side jamb forming part of the left sidelight section, assembling a right sidelight section, the right frame-side jamb forming part of the right sidelight section, and assembling a header section extending between the left and right sidelight sections, the frame-side transom forming part of the header section. In another further embodiment, installing the temporary enclosure is followed by glazing the left and right sidelight sections and the header section. In another further embodiment, installing the temporary enclosure system within the entryway comprises removably coupling a left temporary jamb piece to the left frame-side jamb, removably coupling a right temporary jamb piece to the right frame-side jamb, removably coupling a temporary header piece to the frame-side transom, securing one or more temporary panels within the entryway, the one or more temporary panels having a first lateral side received within a first longitudinal slot defined by the left frame-side jamb, a second lateral side received within a second longitudinal slot defined by the right frame-side jamb, and an upper end received within a third longitudinal slot defined in the frame-side transom. In another further embodiment, securing the one or more temporary panels within the entryway is preceded by installing a threshold at a bottom of the entryway, the threshold extending between the left and right temporary jamb pieces, and arranging a central support to extend vertically between the threshold and the temporary header piece. In another further embodiment, the one or more temporary panels comprise first and second temporary panels and the method further includes removably fastening the first temporary panel to the central support, the first temporary panel providing the first lateral side and extending between the central support and the left frame-side jamb, and removably fastening the second temporary panel to the central support, the second temporary panel providing the second lateral side and extending between the central support and the right frame-side jamb. In another further embodiment, the method further includes supporting weight of glazing of a header section with the central support. In another further embodiment, installing the threshold at the bottom of the entryway further comprises arranging a threshold protective cover to interpose the threshold and a bottom of the central support, and resting a bottom of the one or more temporary panels on the threshold protective cover.

Embodiments disclosed herein include an enclosure system for a building that includes an entryway for the building defined by opposing left and right frame-side jambs and a frame-side transom extending between the left and right frame-side jambs, a left door-side jamb attachable to the left frame-side jamb to form an assembled left jamb, a right door-side jamb attachable to the right frame-side jamb to form an assembled right jamb, a door-side transom attachable to the frame-side transom to form an assembled transom, and one or more doors hung within the entryway and extending laterally between the assembled left and right jambs and vertically to the assembled transom.

DETAILED DESCRIPTION

The present disclosure relates generally to the construction and installation of door frames and, more particularly, to an enclosure system for a building that includes a temporary enclosure system used to temporarily secure the building until doors can be properly hung to fully secure the building. The enclosure system described herein includes an entryway for the building defined by opposing left and right frame-side jambs and a frame-side transom extending between the left and right frame-side jambs. Once the entryway is defined, a temporary enclosure system can then be removably installable within the entryway to temporarily secure the building. Once the doors for the entryway are received on site, the temporary enclosure system can then be removed and a left door-side jamb may be attached to the left frame-side jamb to form an assembled left jamb, a right door-side jamb may be attached to the right frame-side jamb to form an assembled right jamb, and a door-side transom may be attached to the frame-side transom to form an assembled transom. The doors may then be hung within the entryway and extend laterally between the assembled left and right jambs and vertically to the assembled transom.

Additionally, this disclosure embodies interim steps in enclosing the building. Prior to completing the installation of the door-side framing to the framing-side connections listed above, a semi-temporary building enclosure is possible. This disclosure includes the methodologies for performing said building enclosure.

Figure 1:
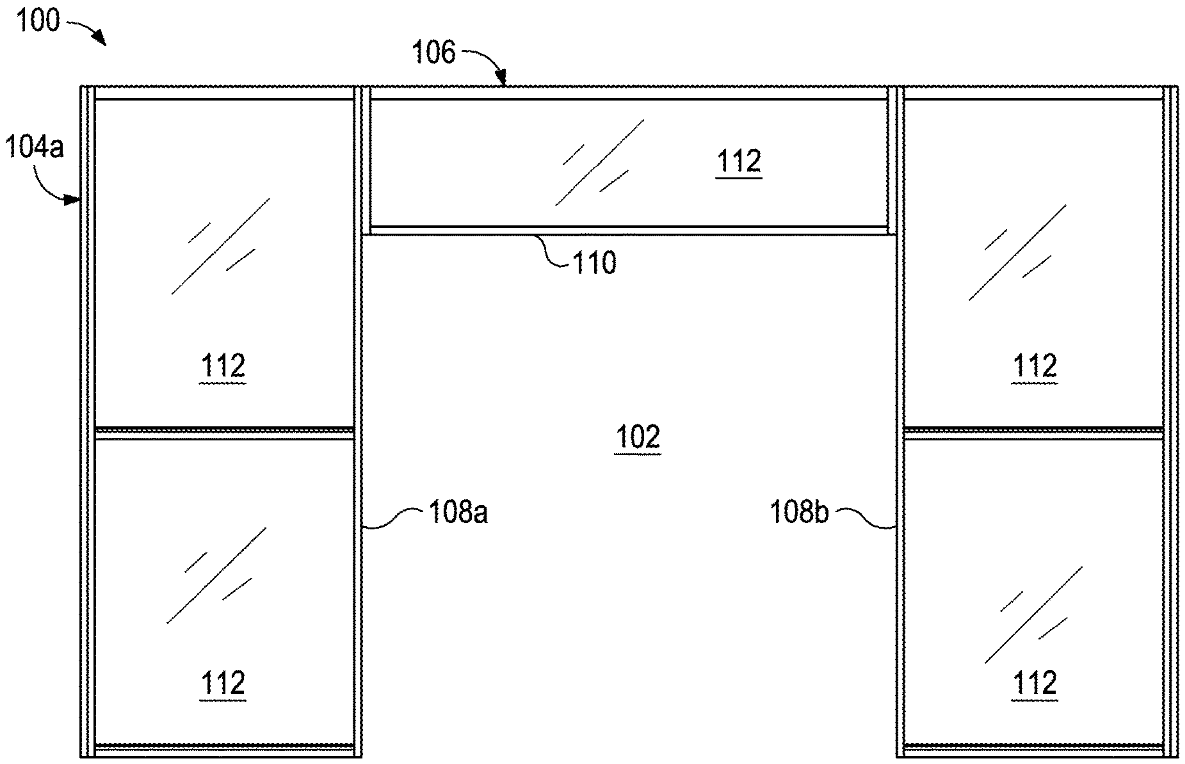
FIG. 1 is a schematic side view of an example enclosure system that may incorporate the principles of the present disclosure.

FIG. 1 is a schematic side view of an example enclosure system 100 that may incorporate the principles of the present disclosure. The enclosure system 100 (hereafter, "the system 100") may form part of a commercial or business building, such as a storefront or business establishment. As illustrated, the system 100 may include a frame assembly that defines an opening or "entryway" 102 configured to receive one or more doors that facilitate ingress or egress access for the building. More specifically, the frame assembly may include a first or "left" sidelight section 104*a*, a second or "right" sidelight section 104*b*, and a header section 106 extending between the left and right sidelight sections 104*a,b*. The combination of the left and right sidelight sections 104*a,b* and the header section 106 cooperatively define the entryway 102. In some applications, for example, the entryway 102 may be defined by only one of the sidelight sections 104*a,b* and the header section 106. In such embodiments, the opposite side of the sidelight section 104*a,b* may comprise an upright support or "substrate jamb," such as at an exterior wall condition of a building.

According to embodiments of the present disclosure, the entryway 102 may be temporarily defined or provided by opposing partial jambs and a partial header or "transom". This may prove advantageous in allowing a contractor to finish assembling and "drying in" (e.g., glazing) the system 100 before the doors designed to be hung within the entryway 102 are received on-site, which could be several weeks later. The partial jambs and the partial transom allow the contractor to enclose the entryway 102 with a temporary enclosure, thereby mitigating potential damage from the elements or possible theft or vandalism within the interior of the building. Once the doors are received, corresponding door-side jambs and a door-side transom may be attached to the partial jambs and the partial transom, respectively, and the doors can then be hung properly within the entryway 102 as designed.

As illustrated, the left sidelight section 104*a* may provide a first or "left" frame-side jamb 108*a*, the right sidelight section 104*b* may provide a second or "right" frame-side jamb 108*b*, and the header section 106 may provide a frame-side transom 110. The left and right frame-side jambs 108*a,b* extend substantially vertically, and the frame-side transom 110 extends substantially horizontal between the left and right frame-side jamb 108*a,b*. The frame-side jambs 108*a,b* and the frame-side transom 110 cooperatively define the entryway 102. Each frame-side jamb 108*a,b* structurally comprises a portion (e.g., one half) of a full structural jamb, and the frame-side transom 110 structurally comprises a portion (e.g., one half) of a full structural header.

The frame-side jambs 108*a,b* and the frame-side transom 110 may be installed during assembly of the system 100 to allow the remaining portions of the system 100 to be completed (e.g., "dried in" or glazed). In particular, by installing the frame-side jambs 108*a,b* and the frame-side transom 110, corresponding panels 112 may be installed in the left and right side light sections 104*a,b* and the header section 106. Each panel 112 may include, but is not limited to, a pane of window glass, polycarbonate, or another clear, translucent, tinted, or opaque panel. In the illustrated embodiment, each sidelight section 104*a,b* includes two sidelight bays with corresponding panels 112 flanking the entryway 102. In other embodiments, more or less than two sidelight bays may be included in one or both sidelight section 104*a,b*. Similarly, the header section 106 is shown including only one transom bay with a corresponding panel 112, but could alternatively include two or more smaller transom bays, without departing from the scope of this disclosure. In embodiments that include only one of the sidelight sections 104*a,b*, one of the frame-side jambs 108*a,b* may be attached (anchored) to an upright support or "substrate jamb". In such embodiments, no panels 112 would be installed on that side of the entryway 102.

According to embodiments of the present disclosure, after constructing the system 100 as shown in FIG. 1, the entryway 102 may be temporarily enclosed with a temporary enclosure system. The temporary enclosure system may be configured to be temporarily and removably attached to the frame-side jambs 108*a,b* and the frame-side transom 110. The temporary enclosure system may help secure the building and thereby prevent damage from weather events and/or theft and vandalism from occurring within the building. The temporary enclosure system may remain in place until the doors designed to be hung within the entryway 102 and remaining frame portions of the system 100 are received on-site, at which point the temporary enclosure system may be removed and the doors may be hung to permanently secure the building.

Figure 2:
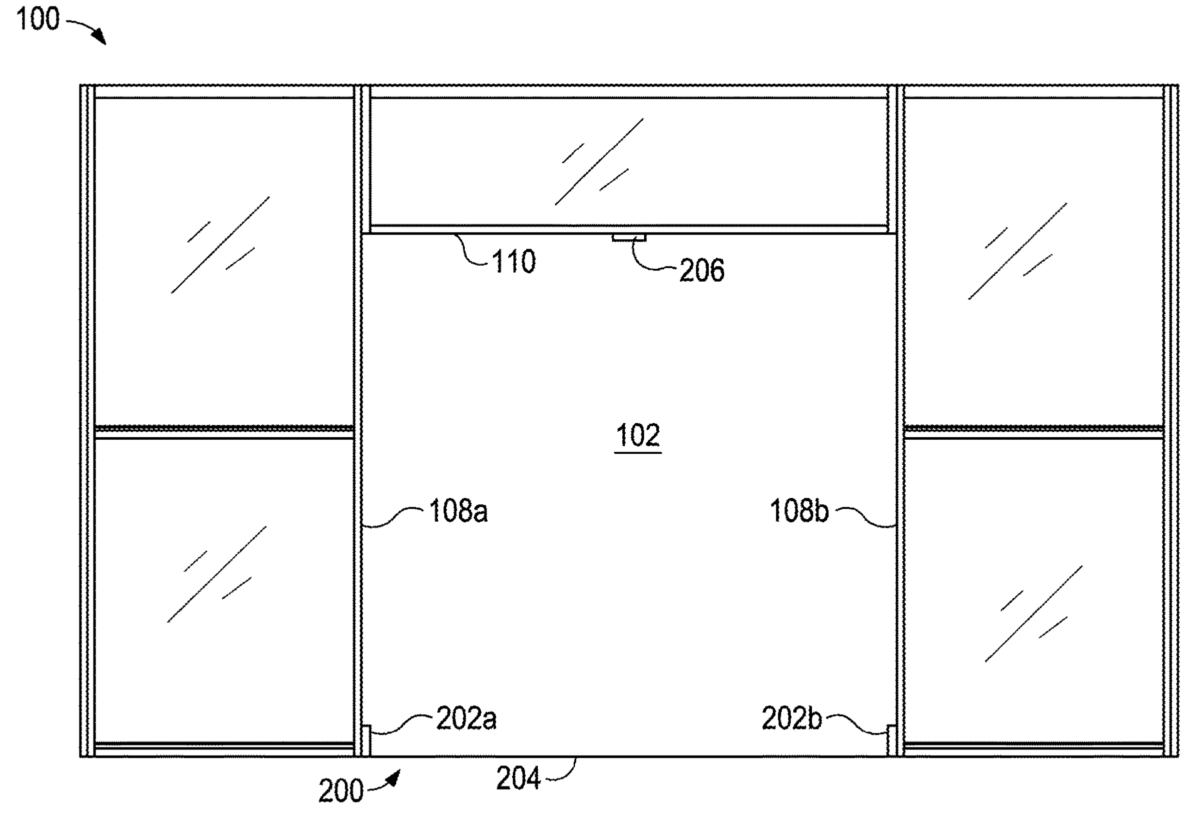
FIGS. 2-4 are schematic side views of the enclosure system of FIG. 1 showing progressive installation of an example temporary enclosure system, according to one or more embodiments of the present disclosure.
Figure 3:
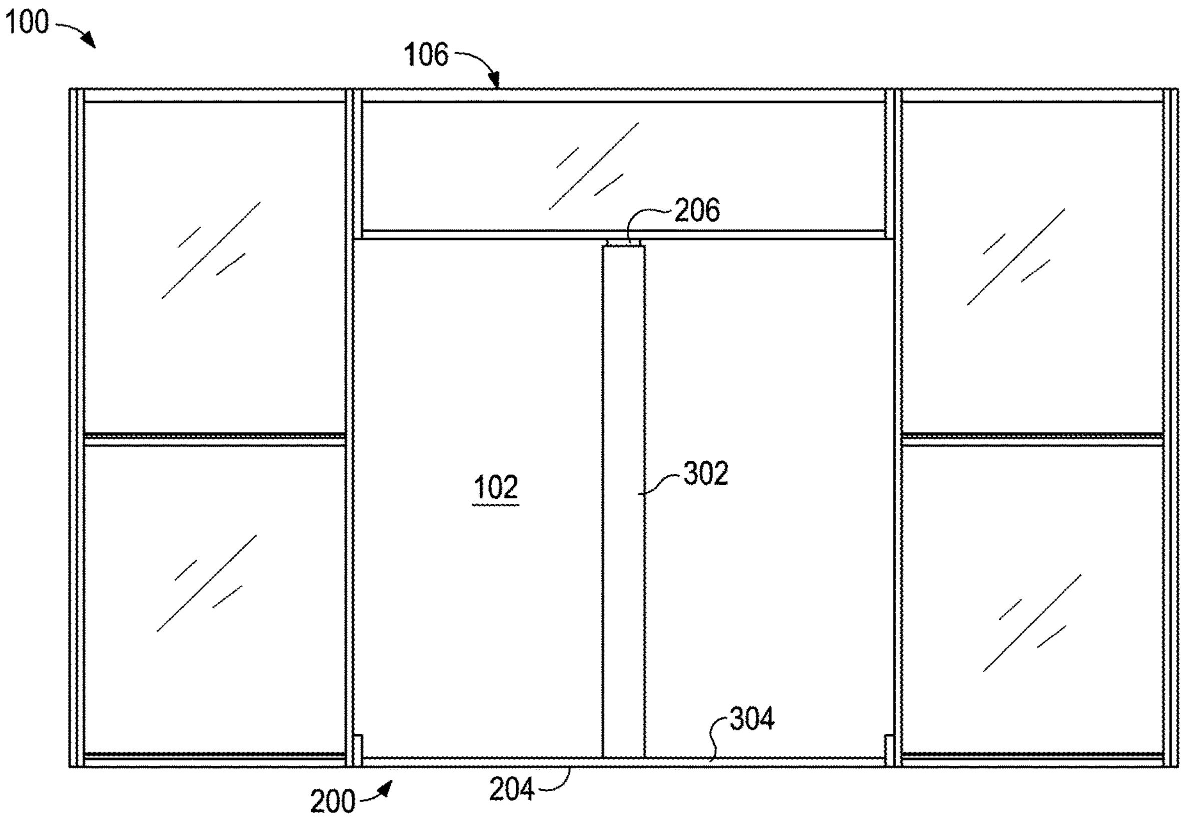
Figure 4:
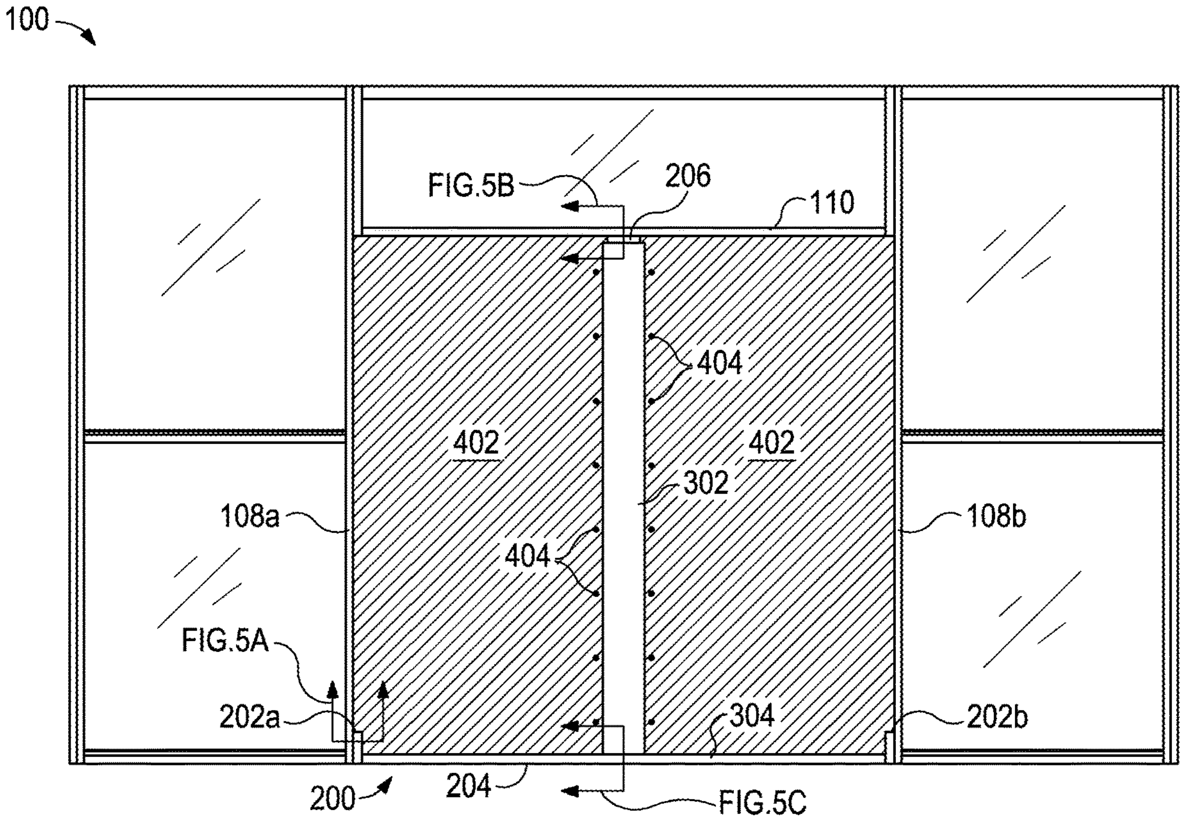

FIGS. 2-4 are schematic side views of the system 100 showing progressive installation of an example temporary enclosure system 200, according to one or more embodiments of the present disclosure. As illustrated, the temporary enclosure system 200 may include a first or "left" temporary jamb piece 202*a* and a second or "right" temporary jamb piece 202*b*. The left temporary jamb piece 202*a* may be removably coupled to the left frame-side jamb 108*a* and the right temporary jamb piece 202*b* may be removably coupled to the right frame-side jamb 108*b*. In some embodiments, the temporary jamb pieces 202*a,b* may each exhibit a height of about six inches, but could alternatively exhibit a height greater or less than six inches.

In some applications, a threshold 204 may be installed at the bottom of the entryway 102. The threshold 204 may be permanently secured to an underlying substrate, such as the ground, a concrete slab, or another common type of underlayment. In some embodiments, the threshold 204 does not span the full length between the frame-side jambs 108*a,b*, but instead a gap may remain on either lateral side of the threshold 204 to eventually accommodate corresponding left and right door-side jambs, as discussed below. The gap on either lateral side of the threshold 204 may be temporarily filled with the left and right temporary jamb pieces 202*a,b* mated to the adjacent frame-side jambs 108*a,b*. The temporary jamb pieces 202*a,b* may later be removed when the left and right door-side jambs are installed, and the door-side jambs will then occupy the gap.

Still referring to FIG. 2, the temporary enclosure system 200 may further include a temporary header piece 206 removably coupled to the frame-side transom 110. In some embodiments, as illustrated, the temporary header piece 206 may be arranged at or near the center of the frame-side transom 110, but could alternatively be arranged at other locations along the length of the frame-side transom 110. As described in more detail below, when it comes time for the doors to be hung in the entryway 102, the temporary header piece 206 will be removed and a door-side transom will be attached to the frame-side transom 110 and extend between the previously-installed left and right door-side jambs.

Referring to FIG. 3, the temporary enclosure system 200 may further include a central support 302 arranged within the entryway 102 and extending vertically between the threshold 204 and the temporary header piece 206. The central support 302 may directly engage the temporary header piece 206 and thereby provide vertical reinforcement to the header section 106. As a result, the central support 302 may allow glazing of the header section 106 such that the weight of the inserted glass (or other infill material) does not cause the header section 106 to sag or deform. In at least one embodiment, the central support 302 may further be reinforced for the interior of the building by diagonal supports (not shown) anchored into the floor or a similar substrate to resist forced entry through the entryway 102.

In some embodiments, the central support 302 may comprise a length of wood, such as a 2"×6". In other embodiments, however, the central support 302 may be made of other materials including, but not limited to, a metal, a plastic, hardboard, or any other building material capable of supporting the weight of the header section 106. In one or more embodiments, the central support 302 may be comprise a permanent feature of the system 100 to be retained upon and after door installation. In such embodiments, the central support 302 may be made of a similar material as the doors.

In some embodiments, as illustrated, a threshold protective cover 304 may be arranged on top of the threshold 204 such that the threshold protective cover 304 interposes the threshold 204 and the bottom of the central support 302. The threshold protective cover 304 may be used to prevent damage to the threshold 204 until the doors can be properly hung within the entryway 102. The threshold protective cover 304 may also be used to help secure the bottom end of the central support 302, such as through the use of one or more mechanical fasteners or the like. In one or more embodiments, the threshold protective cover 304 may comprise a length of wood, such as a 2"×6". In other embodiments, however, the threshold protective cover 304 may be made of other materials including, but not limited to, a metal, a plastic, hardboard, or any other building material capable of protecting the threshold 204. In at least one embodiment, the threshold protective cover 304 may comprise a cap sized to encapsulate the upper portions of the threshold 204.

Referring to FIG. 4, the temporary enclosure system 200 may further include one or more temporary panels 402 installed to fully enclose the entryway 102 (FIGS. 1-3). Two temporary panels 402 are depicted in FIG. 4, and each temporary panel 402 extends vertically between the threshold 204 (e.g., the threshold protective cover 304) and the frame-side transom 110. In the illustrated embodiment, the bottom of each temporary panel 402 rests on the threshold protective cover 304 and has a height sufficient to extend vertically into a slot or groove (not visible) defined within the frame-side transom 110. In some embodiments, each temporary panel 402 may be notched and otherwise cut to accommodate the shape of the temporary header piece 206, which enables the temporary panel 402 to fit tightly within the entryway 102.

The temporary panels 402 also extend laterally between the central support 302 and the corresponding frame-side jamb 108*a,b*. In some embodiments, each temporary panel 402 may be removably fastened to the central support 302. In the illustrated embodiment, for example, each temporary panel 402 is fastened to the central support 302 using one or more mechanical fasteners 404 (e.g., screws, bolts, or the like). In other embodiments, however, the temporary panels 402 may be fastened to the central support 302 using other fastening means, such as welding or an adhesive (and depending on the material of the central support 302). The width (or span) of each temporary panel 402 may be sufficient to extend laterally into a slot or groove (not visible) defined in the adjacent frame-side jamb 108*a,b*. In some embodiments, each temporary panel 402 may be notched and otherwise cut to accommodate the shape of the corresponding temporary jamb piece 202*a,b*, which enables the temporary panel 402 the fit tightly within the entryway 102.

The temporary panels 402 may be made of a variety of rigid construction materials including, but not limited to wood, chip board, sheet-metal, plastic, hardboard, any combination thereof, or any other building material that can provide a barrier and can be sized (e.g., cut) to the entryway 102. In at least one embodiment, the temporary panels 402 may comprise plywood sheets exhibiting a thickness of at least one inch for security and ease of installation.

Figure 5A:
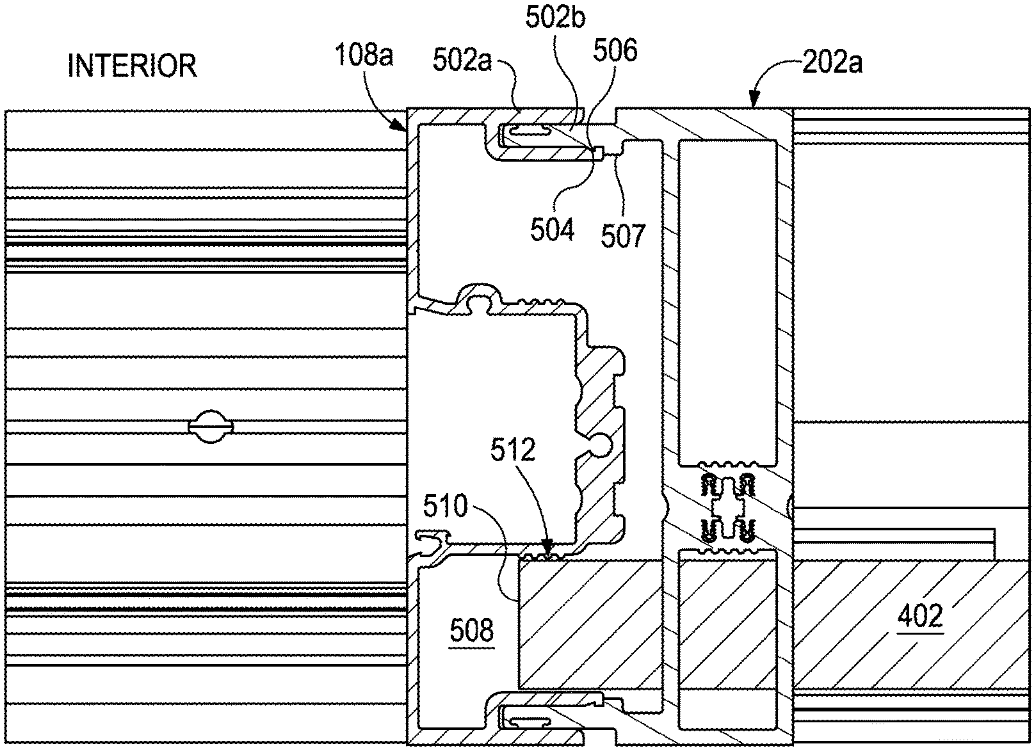
FIGS. 5A-5C are cross-sectional views of the temporary enclosure system taken along the lines indicated in FIG. 4, according to one or more embodiments.
Figure 5B:
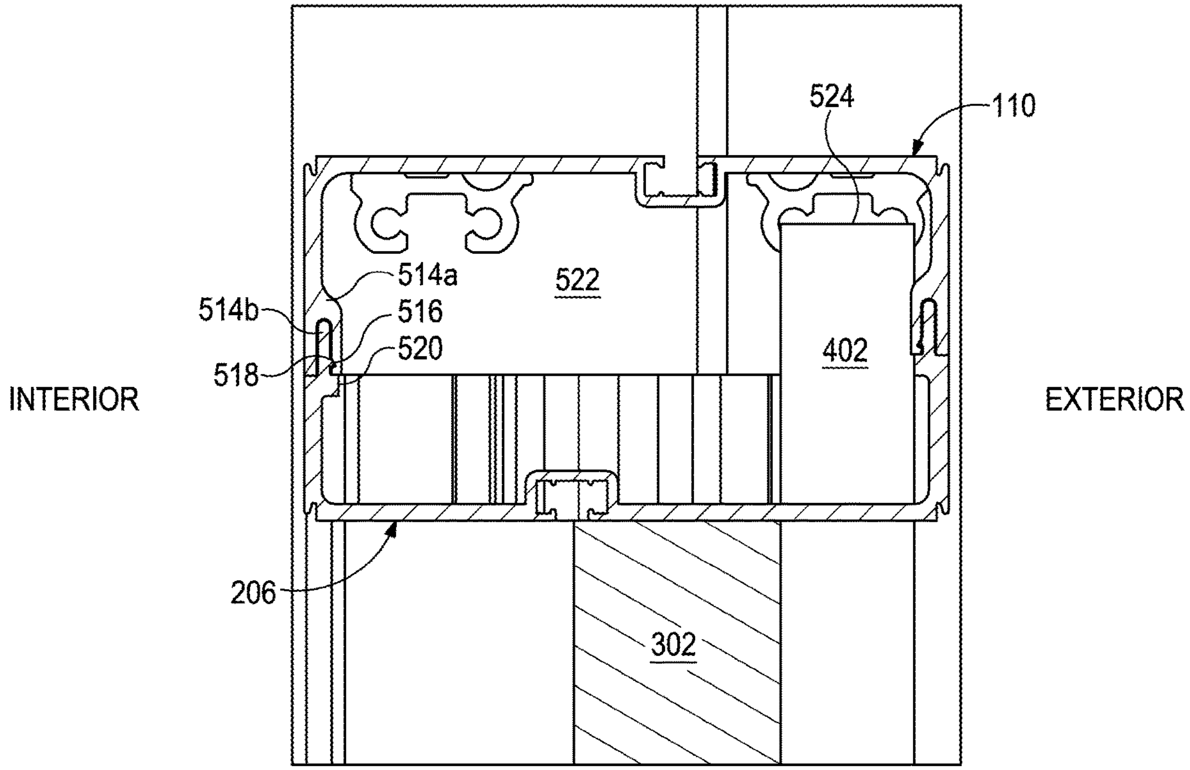
Figure 5C:
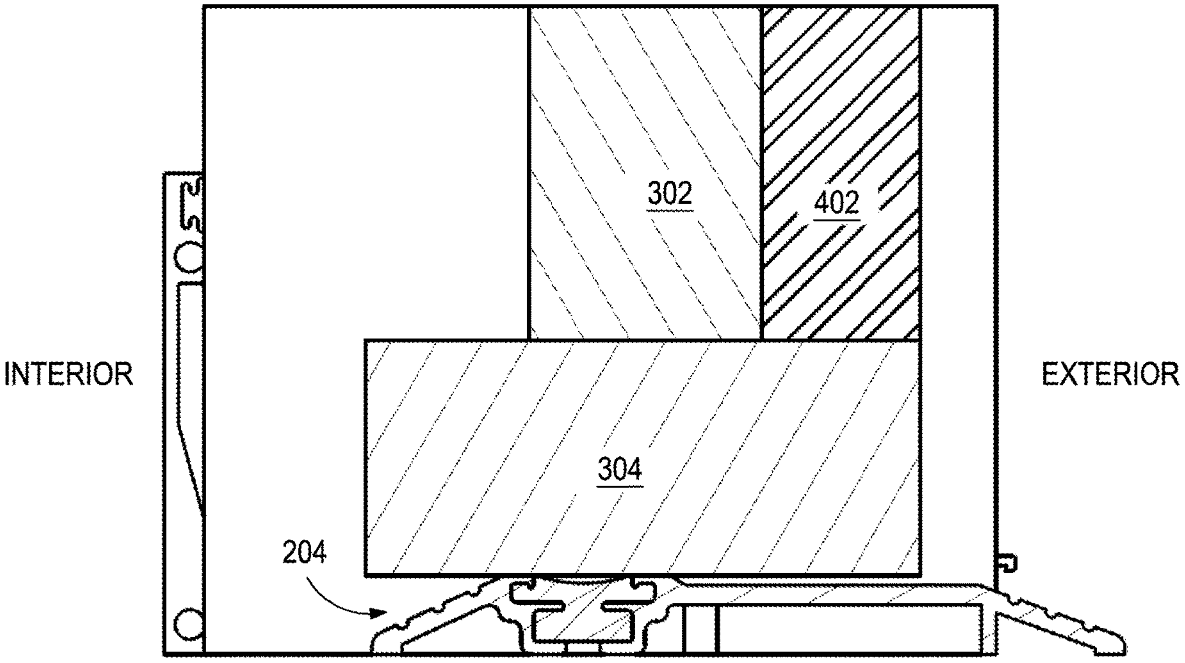

FIGS. 5A-5C are cross-sectional views of the temporary enclosure system 200 taken along the lines indicated in FIG. 4, according to one or more embodiments.

Referring first to FIG. 5A, the left temporary jamb piece 202*a* is depicted as being removably attached to the left frame-side jamb 108*a*. While the following discussion is related to the left temporary jamb piece 202*a* and the left frame-side jamb 108*a*, the discussion is equally applicable to the right temporary jamb piece 202*b* being removably attached to the right frame-side jamb 108*b*.

As illustrated, the temporary jamb piece 202*a* and the frame-side jamb 108*a* may each provide complementary mating features 502*a* and 502*b* that removably attach the temporary jamb piece 202*a* to the frame-side jamb 108*a*. In the illustrated embodiment, the first mating feature 502*a* comprises a channel defined by the frame-side jamb 108*a*, and the second mating feature 502*b* comprises a flange extending from the temporary jamb piece 202*a* and sized to be received within the channel. In other embodiments, however, the channel may alternatively be defined in the temporary jamb piece 202*a*, and the flange may be provided by the frame-side jamb 108*a*, without departing from the scope of the disclosure.

In some embodiments, the mating engagement between the mating features 502*a,b* may be enhanced with a notch 504 defined on the first mating feature 502*a*, and a corresponding protrusion 506 may be defined on the second mating feature 502*b*. As the second mating feature 502*b* is extended into the first mating feature 502*a*, the protrusion 506 will eventually locate and be received within the notch 504, thereby helping to secure the temporary jamb piece 202*a* to the frame-side jamb 108*a*. As will be appreciated, the notch 504 may alternatively be defined on the second mating feature 502*b* and the protrusion 506 may alternatively be defined on the first mating feature 502*a*, without departing from the scope of the disclosure. Moreover, further retention elements may be included, such as a stop shoulder 507, or multiple protrusions similar to the protrusions 506, which may reinforce the connection point and help prevent further lateral movement.

Those skilled in the art will readily appreciate that the mating features 502*a,b* and the notch 504 and corresponding protrusion 506 are not limited to what is depicted in FIG. 5A. Rather, additional methods, systems, and mechanisms for mating and securing the temporary jamb piece 202*a* to the frame-side jamb 108*a* may be employed, without departing from the scope of this disclosure. Moreover, as described in more detail below, when it is time to install the doors, and after removing the temporary jamb piece 202*a* from the frame-side jamb 108*a*, a mating feature similar to the second mating feature 502*b* will be provided on the door-side jamb (not shown) to be able to secure the door-side jamb to the frame-side jamb 108*a*.

As further illustrated in FIG. 5A, the left frame-side jamb 108*a* further defines and otherwise includes a longitudinal slot 508 sized to receive a lateral side 510 of the temporary panel 402. In some embodiments, a retaining feature 512 may be provided by and otherwise defined within the longitudinal slot 508 to grip and help retain the temporary panel 402 within the longitudinal slot 508 once received therein. In the illustrated embodiment, the retaining feature 512 comprises a plurality of teeth angled toward the interior of the longitudinal slot 508. In the event that the temporary panel 402 is forced out of the longitudinal slot 508 by vandals, thieves, etc., the angled teeth will dig into or otherwise grip against the outer surface of the temporary panel 402 to help prevent its removal.

Referring to FIG. 5B, the temporary header piece 206 is depicted as being removably attached to the frame-side transom 110. As illustrated, the temporary header piece 206 and the frame-side transom 110 may each provide complementary mating features 514*a* and 514*b*. In some embodiments, as illustrated, the mating features 514*a,b* may be substantially similar to the mating features 502*a,b* (FIG. 5A). In particular, the first mating feature 514*a* comprises a channel defined in the frame-side transom 110, and the second mating feature 514*b* comprises a flange extending from the temporary header piece 206 and sized to be received within the channel. In other embodiments, however, the channel may alternatively be defined in the temporary header piece 206, and the flange may alternatively be provided by the frame-side transom 110, without departing from the scope of the disclosure.

In some embodiments, the mating engagement between the mating features 514*a,b* may be enhanced with a notch 516 defined on the first mating feature 514*a*, and a protrusion 518 may be defined on the second mating feature 514*b*. As the second mating feature 514*b* is extended into (received within) the first mating feature 514*a*, the protrusion 518 will eventually locate and be received within the notch 516, thereby helping to secure the temporary header piece 206 to the frame-side transom 110. As will be appreciated, the notch 516 may alternatively be defined on the second mating feature 514*b* and the protrusion 518 may alternatively be defined on the first mating feature 514*a*, without departing from the scope of the disclosure. Moreover, further retention elements may be included, such as a stop shoulder 520, which may reinforce the connection point and prevent further movement.

Those skilled in the art will readily appreciate that the mating features 514*a,b* and the notch 516 and corresponding protrusion 518 are not limited to what is depicted in FIG. 5B. Rather, additional methods, systems, and mechanisms for mating and securing the temporary header piece 206 to the frame-side transom 110 may be employed, without departing from the scope of this disclosure. Moreover, as described in more detail below, when it is time to install the doors, and after removing the temporary header piece 206 from the frame-side transom 110, a similar mating feature will be provided on the door-side transom (not shown) to be able to secure the door-side transom to the frame-side transom 110.

As further illustrated in FIG. 5B, the central support 302 extends to and may directly engage the underside of the temporary header piece 206. Moreover, the frame-side transom 110 further defines and otherwise includes a longitudinal slot 522 sized to receive an upper end 524 of the temporary panel 402.

FIG. 5C is a cross-sectional side view of the threshold 204 with the central support 302 and the temporary panel 402 extending vertically therefrom, as generally described above. In the illustrated embodiment, the threshold protective cover 304 is included and arranged to interpose the threshold 204 and the central support 302 and further interpose the threshold 204 and the temporary panel 402, which rests on the threshold protective cover 304. The threshold protective cover 304 depicted in FIG. 5C comprises a 2"×6" section of lumber (wood), but could alternatively comprise a cap that fully encapsulates the threshold 204, as mentioned above. In some embodiments, the threshold protective cover 304 may be secured to the threshold 204, such as by using one or more mechanical fasteners or an adhesive.

When the doors for the system 100 (FIG. 1) are delivered and ready to be installed into the entryway 102 (FIG. 1), the temporary enclosure system 200 described herein with respect to FIGS. 2-4 may be disassembled and otherwise removed from the entryway 102 in preparation for receipt and hanging of the doors. In particular, the temporary panels 402 (FIG. 4) may first be detached from the entryway 102. This may be accomplished, for example, by detaching the temporary panels 402 from the central support 302 (FIGS. 3-4), and once detached, the temporary panels 402 may be moved laterally and vertically to dislodge the temporary panels 402 from the longitudinal slots 508 (FIG. 5A) defined in the frame-side jambs 108*a,b* (FIG. 5A) and from the longitudinal slot 522 (FIG. 5B) defined in the frame-side transom 110 (FIG. 5B). The central support 302 may then be removed and the temporary header piece 206 (FIGS. 2-3) may be detached from the frame-side transom 110. In some applications, the threshold 204 (FIGS. 2-4) may then be temporarily removed, but could alternatively remain in place during the subsequent installation process, if desired. Moreover, if the threshold protective cover 304 (FIG. 3) is used, it may also be removed at this time. The left and right temporary jamb pieces 202*a,b* (FIG. 2) may then be detached from the corresponding left and right frame-side jambs 108*a,b*. Once the temporary enclosure system 200 is fully disassembled, the system 100 will be in the state depicted in FIG. 1.

FIGS. 6A-6H are isometric views of the system 100 depicting example installation of doors into the entryway 102, according to one or more embodiments.

Figure 6A:
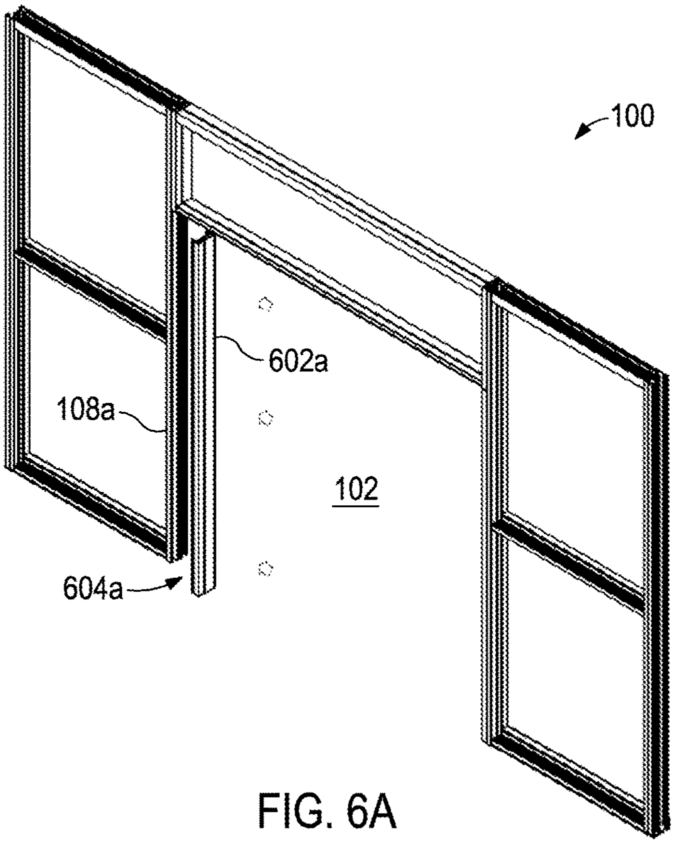
FIGS. 6A-6H are isometric views of the system of FIG. 1 depicting example installation of doors into the entryway, according to one or more embodiments.
Figure 6B:
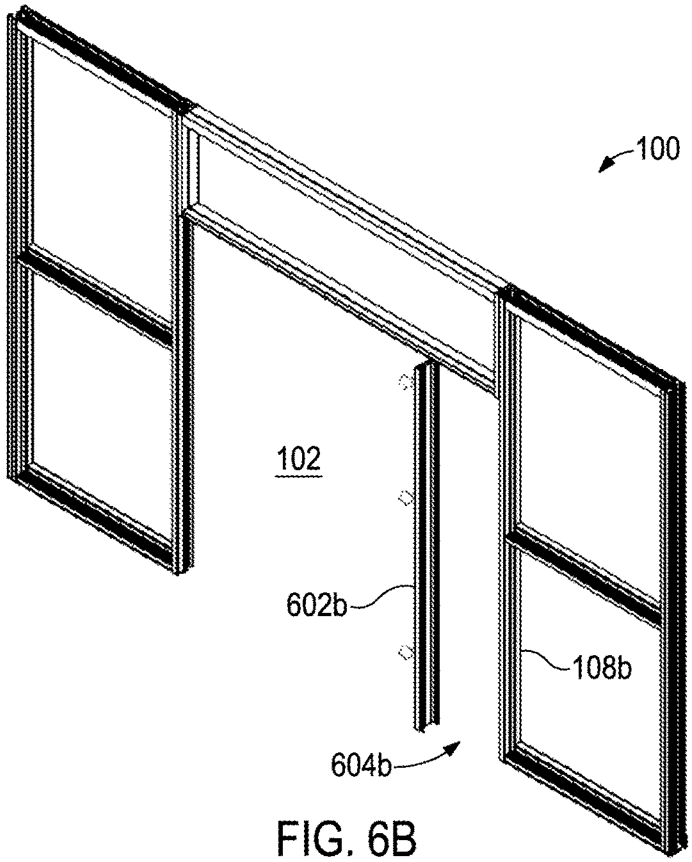

In FIG. 6A, a first or "left" door-side jamb 602*a* is advanced and attached to the left frame-side jamb 108*a*, and in FIG. 6B a second or "right" door-side jamb 602*b* is advanced attached to the right frame-side jamb 108*b*, respectively. The frame-side jambs 108*a,b* and the door-side jambs 602*a,b* may include the mating features 502*a,b* described herein with respect to FIG. 5A, optionally including the matable notch 504 and corresponding protrusion 506. The mated engagement and combination of the left frame-side and door-side jambs 108*a*, 602*a* provides an assembled left jamb 604*a*, and the mated engagement and combination of the right frame-side and door-side jambs 108*b*, 602*b* provides an assembled right jamb 604*b*.

Figure 6C:
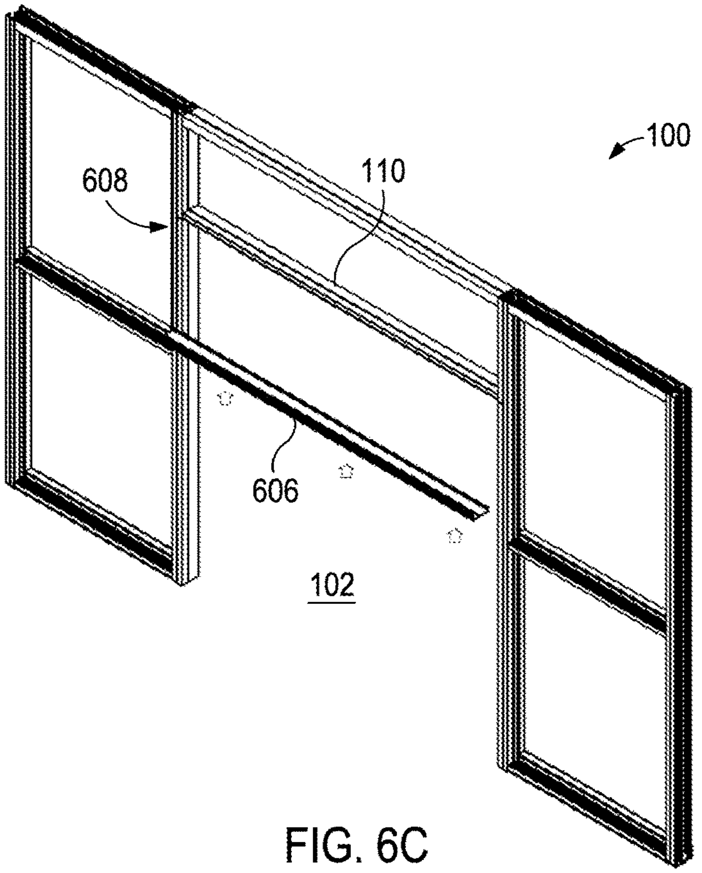

In FIG. 6C, a door-side transom 606 may be advanced and attached to the frame-side transom 110. The frame-side transom 110 and the door-side transom 606 may include the mating features 514*a,b* described herein with respect to FIG. 5B, optionally including the notch 516 and corresponding protrusion 518. The mated engagement and combination of the frame-side transom 110 with the door-side transom 606 provides an assembled transom 608.

Figure 6D:
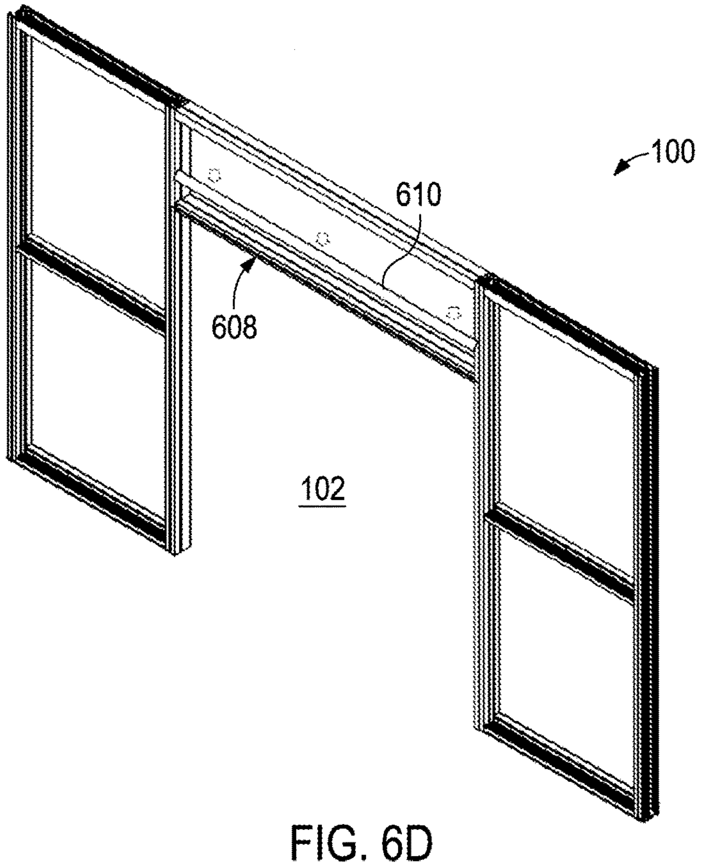

In FIG. 6D, interior and exterior header covers 610 (only one shown) may be installed on the interior and exterior surfaces of the assembled transom 608. The header cover 610 may be configured to cover the seams of the previously mated frame-side and door-side transoms 110, 606.

Figure 6E:
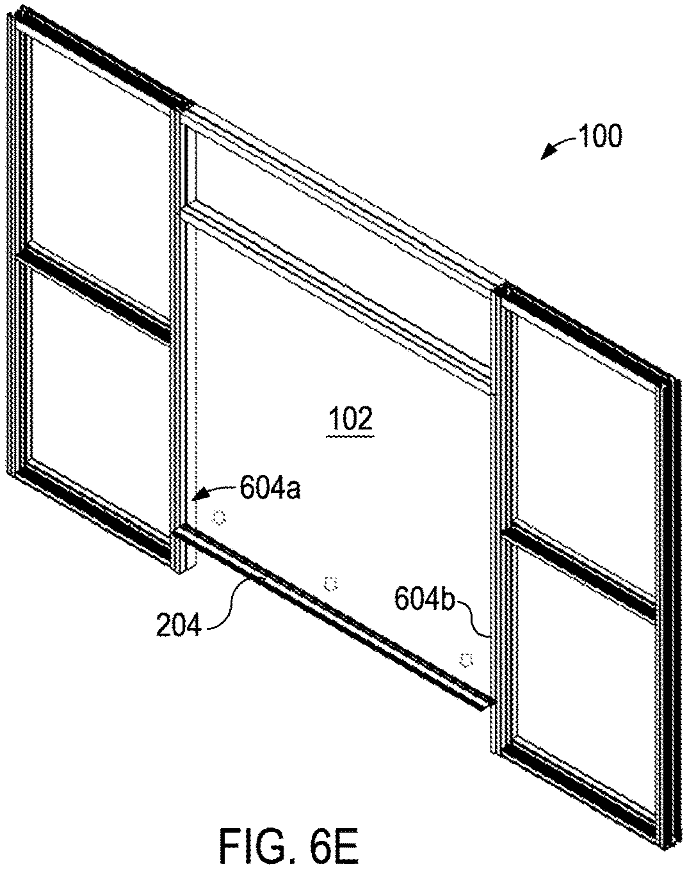

In FIG. 6E, the threshold 204 may be reinstalled in the system 100 at the bottom of the entryway 102 and extend horizontally (laterally) between the assembled left and right jambs 604*a,b*. The threshold 204 may be permanently secured to an underlying substrate at this time, such as the ground, a concrete slab, or another common type of underlayment.

Figure 6F:
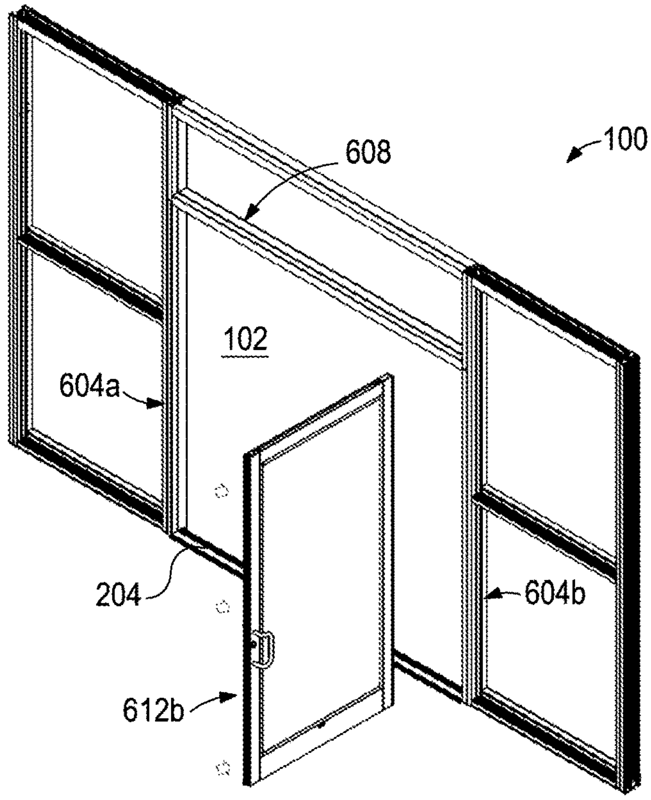
Figure 6G:
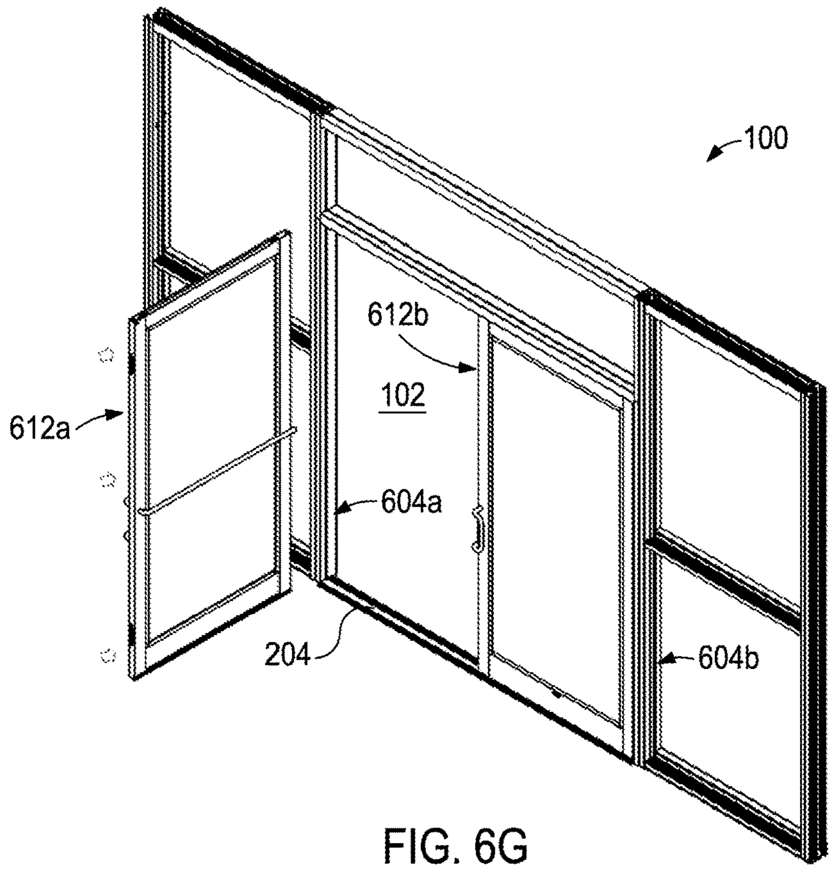

In FIGS. 6F and 6G, two doors 612*a* and 612*b* are hung within the entryway 102 and otherwise rotatably mounted to the system 100. More specifically, the first or "left" door 612*a* is rotatably mounted to the assembled left jamb 604*a*, and the second or "right" door 612*b* is rotatably mounted to the assembled right jamb 604*b*. In other embodiments, however, one or both of the doors 612*a,b* may be rotatably mounted between the assembled transom 608 and the threshold 204, without departing from the scope of the disclosure. As will be appreciated, installation of the left or right doors can occur in any order; i.e., the left door 612*a* first or the right door 612*b* first.

Figure 6H:
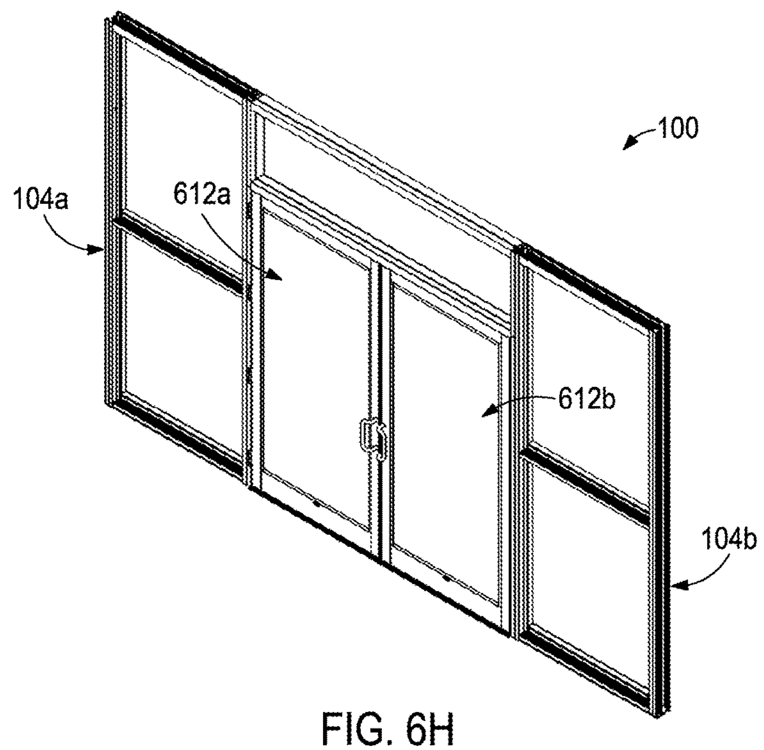

FIG. 6H depicts the final assembled system 100, with the doors 612*a,b* properly mounted and thereby sealing the entryway 102. As mentioned above, in some embodiments, only one of the sidelight sections 104*a,b* may be included. In such embodiments, the corresponding frame-side jamb 108*a,b* (FIGS. 1, 2, and 4) may be installed and anchored to an upright support or "substrate jamb", but the foregoing installation steps would proceed substantially similarly.

Figure 7:
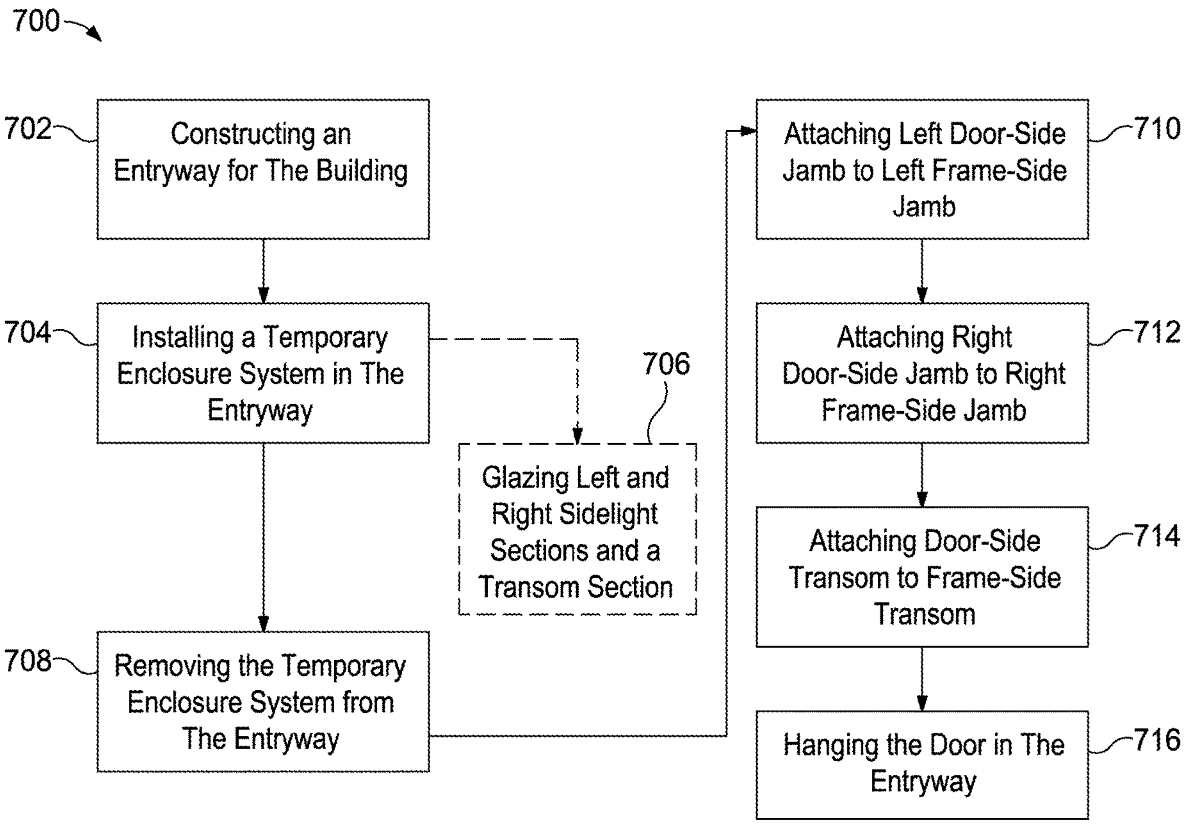
FIG. 7 is a schematic flowchart of an example method of constructing an enclosure system for a building, according to the principles of the present disclosure.

FIG. 7 is a schematic flowchart of an example method 700 of constructing an enclosure system for a building, according to the principles of the present disclosure. As illustrated, the method 700 may include constructing an entryway for the building, as at 702. The entryway may be defined by opposing left and right frame-side jambs and a frame-side transom extending between the left and right frame-side jambs. In some embodiments, constructing the entryway for the building may also include assembling a left sidelight section, where the left frame-side jamb forms part of the left sidelight section, assembling a right sidelight section, where the right frame-side jamb forms part of the right sidelight section, and assembling a header section that extends between the left and right sidelight sections.

Once the entryway is constructed, the method 700 may further include installing a temporary enclosure system within the entryway, as at 704, and thereby securing the building. As described herein, installing the temporary enclosure system within the entryway can include removably coupling a left temporary jamb piece to the left frame-side jamb, removably coupling a right temporary jamb piece to the right frame-side jamb, removably coupling a temporary header piece to the frame-side transom, and securing one or more temporary panels within the entryway. The temporary panels may have a first lateral side received within a first longitudinal slot defined by the left frame-side jamb, a second lateral side received within a second longitudinal slot defined by the right frame-side jamb, and an upper end received within a third longitudinal slot defined in the frame-side transom. In some applications, securing the temporary panels within the entryway may be preceded by installing a threshold at a bottom of the entryway, where the threshold extending between the left and right temporary jamb pieces, and arranging a central support to extend vertically between the threshold and the temporary header piece.

In some embodiments, once the temporary enclosure is fully installed, as at 704, the left and right sidelight sections and the header section may be glazed, as at 706.

Upon receipt of the doors designed to be installed within the entryway, the method 700 may further include removing the temporary enclosure system from the entryway, as at 708, in preparation for receiving the doors. To be able to properly hang the doors, the method 700 may further include attaching a left door-side jamb to the left frame-side jamb to form an assembled left jamb, as at 710, attaching a right door-side jamb to the right frame-side jamb to form an assembled right jamb, as at 712, and attaching a door-side transom to the frame-side transom to form an assembled transom, as at 714. The doors may then be hung in the entryway, as at 716, where the doors extend laterally between the assembled left and right jambs and vertically to the assembled transom.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, interior, exterior and the like are used in relation to the illustrative embodiments as they are depicted in the figures, the upward direction being toward the top of the corresponding figure and the downward direction being toward the bottom of the corresponding figure.

The invention claimed is:

1. An enclosure system for a building, comprising:

a temporary enclosure system removably installable within an entryway for the building, the entryway including opposing left and right frame-side jambs and a frame-side transom extending between the left and right frame-side jambs, the temporary enclosure system including:

a left temporary jamb piece adapted to be removably coupled to the left frame-side jamb and adapted to receive and secure a first lateral side of one or more temporary panels;

a right temporary jamb piece adapted to be removably coupled to the right frame-side jamb and adapted to receive and secure a second lateral side of the one or more temporary panels; and a temporary header piece adapted to be removably coupled to the frame-side transom and adapted to receive and secure an upper end of the one or more temporary panels;

a permanent enclosure system installable within the entryway and including:

a left door-side jamb attachable to the left frame-side jamb to form an assembled left jamb, a right door-side jamb attachable to the right frame-side jamb to form an assembled right jamb, and a door-side transom attachable to the frame-side transom to form an assembled transom; and one or more doors adapted to be hung within the entryway and extending laterally between the assembled left and right jambs and vertically to the assembled transom, wherein the temporary and permanent enclosure systems are separately attachable within the entryway.

2. The enclosure system of claim 1, further comprising:

a left sidelight section, the left frame-side jamb forming part of the left sidelight section;

a right sidelight section, the right frame-side jamb forming part of the right sidelight section; and a header section extending between the left and right sidelight sections, the frame-side transom forming part of the header section.

3. The enclosure system of claim 1, further comprising when the one or more temporary panels are secured within the entryway and including:

the first lateral side is received within a first longitudinal slot defined by the left frame-side jamb;

the second lateral side is received within a second longitudinal slot defined by the right frame-side jamb; and the upper end is received within a third longitudinal slot defined in the frame-side transom.

4. The enclosure system of claim 1, wherein the temporary enclosure system further includes:

a threshold adapted to be installed at a bottom of the entryway and extend between the left and right temporary jamb pieces; and a central support adapted to extend vertically between the threshold and the temporary header piece.

5. The enclosure system of claim 4, wherein the temporary enclosure system further includes a threshold protective cover that interposes the threshold and a bottom of the central support when in the entryway, and wherein a bottom of the one or more temporary panels is adapted to rest on the threshold protective cover.

6. The enclosure system of claim 4, wherein the one or more temporary panels comprises:

a first temporary panel providing the first lateral side and adapted to extend between the central support and the left frame-side jamb; and a second temporary panel providing the second lateral side and adapted to extend between the central support and the right frame-side jamb.

7. The enclosure system of claim 6, wherein the first and second temporary panels are adapted to be removably fastened to the central support.

8. The enclosure system of claim 1, wherein the one or more temporary panels are notched to accommodate a shape of the left and right temporary jamb pieces and the temporary header piece.

9. The enclosure system of claim 1, wherein a) the left temporary jamb piece and the left frame-side jamb, b) the right temporary jamb piece and the right frame-side jamb, and c) the temporary header piece and the frame-side transom each provide complementary first and second mating features that facilitate removable attachment.

10. The enclosure system of claim 9, wherein the complementary first and second mating features each include a notch defined on the first mating feature, and a corresponding protrusion defined on the second mating feature and configured to locate and be received within the notch to help enhance the removable attachment.

11. The enclosure system of claim 3, wherein the first and second longitudinal slots each include a retaining feature that grips and helps retain the one or more temporary panels within the first and second longitudinal slots once received therein.

12. The enclosure system of claim 1, wherein the one or more doors comprise a left door rotatably mounted to the assembled left jamb, and a right door rotatably mounted to the assembled right jamb.

13. A method of constructing an enclosure system for a building, comprising:

constructing an entryway for the building, the entryway being defined by opposing left and right frame-side jambs and a frame-side transom extending between the left and right frame-side jambs;

installing a temporary enclosure system within the entryway and thereby securing the building by:

removably coupling a left temporary jamb piece to the left frame-side jamb;

removably coupling a right temporary jamb piece to the right frame-side jamb;

removably coupling a temporary header piece to the frame-side transom;

securing one or more temporary panels within the entryway;

removing the temporary enclosure system from the entryway;

attaching a left door-side jamb to the left frame-side jamb to form an assembled left jamb;

attaching a right door-side jamb to the right frame-side jamb to form an assembled right jamb;

attaching a door-side transom to the frame-side transom to form an assembled transom; and hanging one or more doors within the entryway, the one or more doors extending laterally between the assembled left and right jambs and vertically to the assembled transom.

14. The method of claim 13, wherein constructing the entryway for the building comprises:

assembling a left sidelight section, the left frame-side jamb forming part of the left sidelight section;

assembling a right sidelight section, the right frame-side jamb forming part of the right sidelight section; and assembling a header section extending between the left and right sidelight sections, the frame-side transom forming part of the header section.

15. The method of claim 14, wherein installing the temporary enclosure is followed by glazing the left and right sidelight sections and the header section.

16. The method of claim 13, wherein the one or more temporary panels includes:

a first lateral side received within a first longitudinal slot defined by the left frame-side jamb;

a second lateral side received within a second longitudinal slot defined by the right frame-side jamb; and an upper end received within a third longitudinal slot defined in the frame-side transom.

17. The method of claim 16, wherein securing the one or more temporary panels within the entryway is preceded by:

installing a threshold at a bottom of the entryway, the threshold extending between the left and right temporary jamb pieces; and arranging a central support to extend vertically between the threshold and the temporary header piece.

18. The method of claim 17, wherein the one or more temporary panels comprise first and second temporary panels, the method further comprising:

removably fastening the first temporary panel to the central support, the first temporary panel providing the first lateral side and extending between the central support and the left frame-side jamb; and removably fastening the second temporary panel to the central support, the second temporary panel providing the second lateral side and extending between the central support and the right frame-side jamb.

19. The method of claim 17, further comprising supporting weight of glazing of a header section with the central support.

20. The method of claim 17, wherein installing the threshold at the bottom of the entryway further comprises:

arranging a threshold protective cover to interpose the threshold and a bottom of the central support; and resting a bottom of the one or more temporary panels on the threshold protective cover.

* * * * *